(12) United States Patent
Carella et al.

(10) Patent No.: US 10,597,551 B2
(45) Date of Patent: Mar. 24, 2020

(54) COATING COMPOSITIONS

(71) Applicant: SOLVAY SPECIALTY POLYMERS ITALY S.P.A., Bollate (IT)

(72) Inventors: Serena Carella, Parabiago (IT); Fabio Polastri, Monza (IT); Amelia Mennella, Torre del Greco (IT); Giorgio Maggi, Pavia (IT)

(73) Assignee: SOLVAY SPECIALTY POLYMERS ITALY S.P.A., Bollate (Milan) (IT)

( * ) Notice: Subject to any disclaimer, the term of this patent is extended or adjusted under 35 U.S.C. 154(b) by 0 days.

(21) Appl. No.: 15/526,439

(22) PCT Filed: Nov. 9, 2015

(86) PCT No.: PCT/EP2015/076024
§ 371 (c)(1),
(2) Date: May 12, 2017

(87) PCT Pub. No.: WO2016/075067
PCT Pub. Date: May 19, 2016

(65) Prior Publication Data
US 2018/0298227 A1    Oct. 18, 2018

(30) Foreign Application Priority Data

Nov. 13, 2014  (EP) ..................... 14192958

(51) Int. Cl.
| C09D 127/12 | (2006.01) |
| C09D 123/08 | (2006.01) |
| C08L 23/08 | (2006.01) |
| C08L 27/12 | (2006.01) |

(52) U.S. Cl.
CPC ........ C09D 127/12 (2013.01); C08L 23/0892 (2013.01); C08L 27/12 (2013.01); C09D 123/0892 (2013.01); C08L 2201/50 (2013.01); C08L 2201/54 (2013.01); C08L 2205/02 (2013.01); C08L 2205/025 (2013.01)

(58) Field of Classification Search
CPC ............ C09D 127/12; C09D 123/0892; C08L 23/0892; C08L 27/12; C08L 2201/54; C08L 2205/025
USPC ........................................................ 524/520
See application file for complete search history.

(56) References Cited

U.S. PATENT DOCUMENTS

| 3,624,250 | A | 11/1971 | Carlson |
| 4,512,129 | A | 4/1985 | Riggs |
| 2003/0031875 | A1 | 2/2003 | Abusleme et al. |
| 2005/0070659 | A1 | 3/2005 | Shiow-Ling et al. |
| 2009/0018244 | A1* | 1/2009 | Polastri ............... C08K 5/04 524/300 |
| 2011/0213069 | A1* | 9/2011 | Kanazawa ............. C09D 7/69 524/520 |
| 2012/0015246 | A1* | 1/2012 | Amin-Sanayei ....... H01G 11/30 429/217 |

FOREIGN PATENT DOCUMENTS

EP      1 795 565 A1    6/2007

* cited by examiner

Primary Examiner — Hui H Chin

(57) ABSTRACT

The present invention relates to an aqueous composition comprising at least one partially fluorinated copolymer in the form of particle powder, to a method for its preparation and to its use as a coating.

17 Claims, 3 Drawing Sheets

COATING COMPOSITIONS

CROSS-REFERENCE TO RELATED APPLICATION

This application is a U.S. national stage entry under 35 U.S.C. § 371 of International Application No. PCT/EP2015/076024 filed Nov. 9, 2015, which claims priority to European application No. 14192958.8 filed on Nov. 13, 2014. The entire contents of these applications are explicitly incorporated herein by this reference.

TECHNICAL FIELD

The present invention relates to an aqueous composition comprising at least one partially fluorinated copolymer in the form of particle powder having a bimodal particle size distribution, to a method for its preparation and to its use as a coating.

BACKGROUND ART

Fluoropolymers are widely used to protect metallic surfaces from corrosion due to weathering or to chemical agents. Metal industrial equipment can be protected from the corrosion using coatings based on fluoropolymers. Such coating guarantees chemical inertness towards aggressive environments and may need to be applied directly on various surfaces such as stainless and carbon steel, aluminium, copper, bronze, brass and special alloys. The coating must also be mechanically resistant to withstand friction and impacts during operations and must not crack or wear excessively during normal conditions. Fluorinated materials, such as those based on ethylene/chlorotrifluoroethylene copolymers (ECTFE), are available to be used for coating, particularly those having a Melt Flow Index (MFI) above 10 g/min.

Coatings can be applied on the surfaces to protect via various coating processing methods, including employing polymer dispersions in organic or aqueous solvents and by electrostatic powder coating. However, defects which may occur in a layer of coating, such as pinholes, cracks and porosity, diminish its chemical and mechanical resistance. To reduce the possibility of damages and to minimize the potential weaknesses, multiple layers of polymer coatings are usually applied on the surface of the metal equipment until the desired thickness is obtained. This requires lengthy operation, as an overcoating layer can only be applied after the lower layer has dried. Moreover, adhesion between multiple layers can be imperfect, leading to blistering, delamination and buckling phenomena that ultimately determine poor performance of the protective coating.

The main processes for deposition of a fluoropolymer coating are electrostatic powder coating and application of liquid dispersions.

Deposition via electrostatic powder coating requires that the metal surface to be coated is earthed and heated to a temperature above the melting range of the coating polymer. In addition, generally the surface to be coated must be previously degreased and roughened via chemical etching or via mechanical means to improve adherence of the coating (US 2003/0031875 A (AUSIMONT S.P.A.) Feb. 13, 2003.

In alternative, the coating can be applied using a dispersion of the fluoropolymer in an aqueous solvent system. This method does not require earthing of the substrate and is in general simpler, more environmentally friendly and less energy-consuming than electrostatic powder coating.

Examples of liquid dispersions suitable for coating are disclosed in US 2009/0018244 A (SOLVAY NORTH AMERICA, LLC) Jan. 15, 2009 Liquid fluoropolymer dispersions can be applied to the surface to be coated using various techniques known to the person skilled in the art, such as dipping, spraying, roll method, doctor blade or flow coat methods. It is advantageous that the liquid compositions be applicable directly to the metal surface, so that surface pre-treatment and application of a primer layer are not needed.

US 2011/213069 A (THREE BOND CO.) Sep. 1, 2011 relates to an aqueous coating composition having as main components component (A), an ethylene-vinyl acetate copolymer resin emulsion, and component (B), two or more PTFE (polytetrafluoroethylene) resin powders having different particle diameters, namely a PTFE resin powder (b-1) having an average particle diameter of 2 to 20 µm and a PTFE resin powder (b-2) having an average particle diameter of 20 to 100 µm.

An objective of the present invention is to provide a liquid composition that can be applied homogeneously to a surface, so as to obtain a fluoropolymer-based protective coating that is uniform and free of imperfections, which might lead to poor protection of the surface from weathering and chemical agents.

Another aim of the present invention is to provide a protective coating for a surface that is easily applicable and does not require the deposition of several layers.

SUMMARY OF INVENTION

The present invention achieves these aims by providing a composition comprising an aqueous solvent and a solid portion, wherein:

a) from 15 to 30% in weight/total weight of the solid portion consists of a first powder of at least one partially fluorinated copolymer (copolymer (F)) in the form of particles having average size (D50) from 3 to 6 micrometers;

b) from 70 to 85 w % in weight/total weight of the solid portion consists of a second powder of at least one partially fluorinated copolymer (copolymer (F')), equal to or different from copolymer (F), in the form of particles having average size (D50) from 20 to 90 micrometers, wherein the average particle size is measured according to test method ASTM D1921.

The inventors found that the aqueous composition comprising a solid portion as described above forms a suspension, which remains homogeneous over at least two hours. Notably, after prolonged storage, a complete suspension of any precipitated solid can be obtained upon mild and brief agitation.

These features are particularly advantageous, because the composition of the invention can be easily used to apply an even coating layer, with little or no imperfections such as holes and cracks. This feature reduces the need to apply more than one pass of coating composition. As a result, delamination and buckling phenomena between the coating layers, that may affect the overall efficiency of the coating, are less likely to occur. Notably, due to its stability as a suspension, the composition of the present invention can be easily applied to a surface via standard techniques, such as spraying, dipping or doctor blade method, and remains a homogeneous suspension during its application to the surface, so that constant shaking or stirring of the composition in the reservoir is not needed.

According to the present invention, the aims as defined above are also achieved by the use of the above-described composition as a coating and by an article coated using the same composition. The coatings obtained using the above-described composition advantageously possess improved mechanical properties, reduced water vapour permeability and improved lifetime, which contribute to avoiding corrosion and wear of the coated articles.

The present invention also provides for a process for manufacturing the composition as described above, which process comprises blending in an aqueous solvent system a solid portion comprising a first powder of copolymer (F) particles having average size (D50) from 3 to 6 micrometers and a second powder of copolymer (F') particles having average size (D50) from 20 to 90 micrometers, wherein the weight of the first powder is from 15 to 30% in weight with respect to the total weight of the solid portion and the weight of the second powder is from 85 to 70% in weight with respect to the total weight of the solid portion.

DESCRIPTION OF EMBODIMENTS

Figure 1:
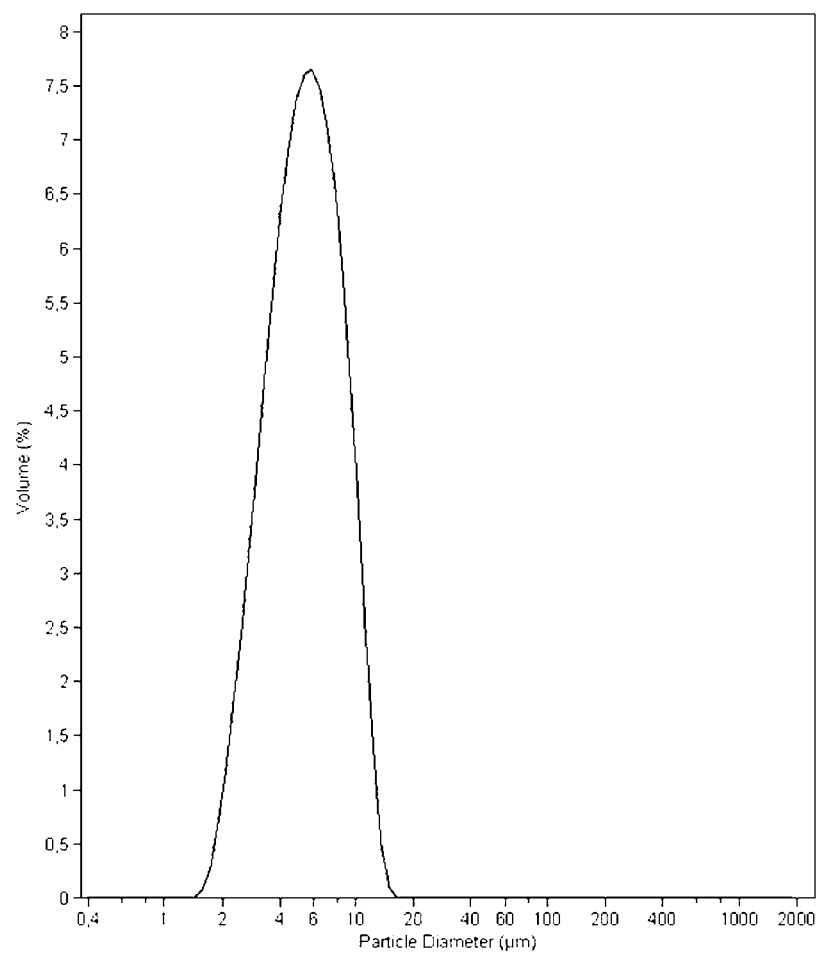
FIG. 1 shows a typical PSD of an ECTFE copolymer A having D50=5 micrometers (suitable as first powder in the composition of the invention).
Figure 2:
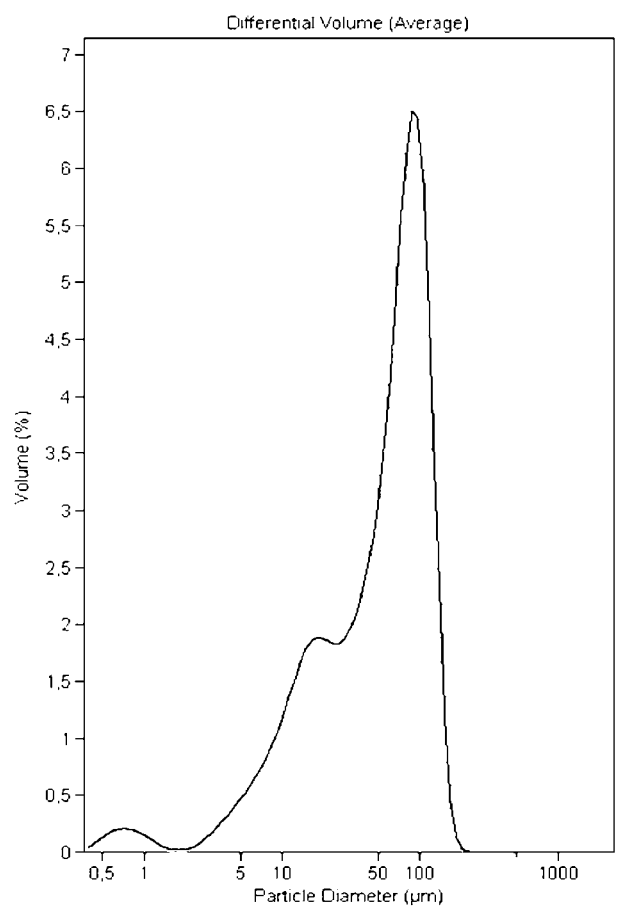
FIG. 2 shows a typical PSD of an ECTFE copolymer B having D50=60 micrometers (suitable as second powder in the composition of the invention).
Figure 3:
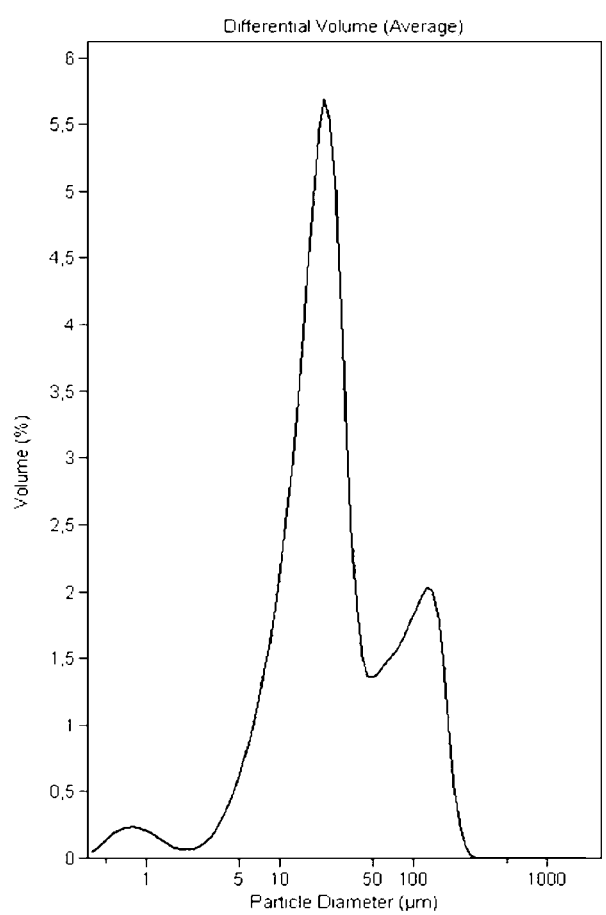
FIG. 3 shows a typical PSD of an ECTFE polymer having D50=22.9 micrometers (suitable as second powder in the composition of the invention).

In the context of the present invention, unless otherwise specified, all the percentages relative to the content of a component in a mixture are in weight of the component over the total weight of the mixture (% wt).

As used herein, "molar percentage" or "mole percent" (mol %) indicates the amount (expressed in moles) of a mixture constituent divided by the total amount of all constituents in the mixture (expressed in moles), multiplied by 100.

As used in the context of the present invention, the term "partially fluorinated copolymer" refers to a polymer comprising recurring units derived from at least one ethylenically unsaturated non-fluorinated monomer, which comprises at least one hydrogen, and recurring units that are derived from at least one fluorinated monomer.

As used in the context of the present invention, the term "fluorinated monomer" indicates a molecule having low molecular weight, which contains at least one fluorine atom and can optionally contain one or more additional halogen atoms (Cl, Br, I). The fluorinated monomers used in the copolymers in the context of the present invention can be either derived from a perfluorinated or per(halo)fluorinated unit (i.e. a molecule comprising only halogen atoms and free of hydrogen atoms, for example tetrafluoroethylene, TFE, and chlorotrifluoroethylene, CTFE) or from a hydrogen-contained fluorinated molecule, for instance vinylidene fluoride and trifluoroethylene.

Non limiting examples of suitable fluorinated comonomers for the copolymers in the context of the present invention are notably $C_3$-$C_8$ perfluoroolefins, such as hexafluoropropene; $C_2$-$C_8$ hydrogenated fluoroolefins, such as vinyl fluoride, 1,2-difluoroethylene, vinylidene fluoride, 3,3,3-trifluoro-2-trifluoromethylpropene (HFIB), and trifluoroethylene; perfluoroalkylethylenes complying with formula $CH_2$=CH—$Rf_0$, in which $Rf_0$ is a $C_1$-$C_6$ perfluoroalkyl; chloro- and/or bromo- and/or iodo-$C_2$-$C_6$ fluoroolefins, like chlorotrifluoroethylene; (per)fluoroalkylvinylethers complying with formula $CF_2$=$CFORf_1$ in which $Rf_1$ is a $C_1$-$C_6$ fluoro- or perfluoroalkyl, e.g. $CF_3$, $C_2F_5$, $C_3F_7$; $CF_2$=$CFOX_0$ (per)fluoro-oxyalkylvinylethers, in which $X_0$ is a $C_1$-$C_{12}$ alkyl, or a $C_1$-$C_{12}$ oxyalkyl, or a $C_1$-$C_{12}$ (per)fluorooxyalkyl having one or more ether groups, like perfluoro-2-propoxy-propyl; (per)fluorooxyalkylvinylethers complying with formula $CF_2$=$CFOCF_2ORf_2$ in which $Rf_2$ is a $C_1$-$C_6$ fluoro- or perfluoroalkyl, e.g. $CF_3$, $C_2F_5$, $C_3F_7$ or a $C_1$-$C_6$ (per)fluorooxyalkyl having one or more ether groups, like —$C_2F_5$—O—$CF_3$; functional (per)fluoroalkylvinylethers complying with formula $CF_2$=$CFOY_0$, in which $Y_0$ is a $C_1$-$C_{12}$ alkyl or (per)fluoroalkyl, or a $C_1$-$C_{12}$ oxyalkyl, or a $C_1$-$C_{12}$ (per)fluorooxyalkyl having one or more ether groups and $Y_0$ comprising a carboxylic or sulfonic acid group, in its acid, acid halide or salt form; fluorodioxoles, especially perfluorodioxoles.

In a preferred embodiment, the partially fluorinated fluoropolymer is selected from the group consisting of: TFE and/or CTFE copolymers with ethylene, propylene or isobutylene (more preferably ethylene), with a molar ratio per (halo)fluoromonomer(s)/hydrogenated comonomer(s) of from 30:70 to 70:30, optionally containing one or more comonomer(s) in amounts of from 0.01 to 30% by moles, based on the total number of moles of TFE and/or CTFE and hydrogenated comonomer(s) (see for instance U.S. Pat. No. 3,624,250 (DU PONT) Nov. 30, 1971 and U.S. Pat. No. 4,513,129 (DAIKIN IND LTD) Apr. 23, 1985).

In a preferred embodiment, in the composition of the invention the copolymer (F) and/or the copolymer (F') comprises:
i. from 1 to 75% mol of recurring units derived from at least one ethylenically unsaturated non-fluorinated monomer, which comprises at least one hydrogen atom; and
ii. from 25% to 99% mol of recurring units derived from at least one fluorinated monomer.

In an even more preferred embodiment, the partially fluorinated fluoropolymer is a CTFE or TFE copolymer. Among these polymers, ECTFE polymers are preferred.

In a more preferred embodiment, the copolymer (F) and/or (F') in the composition of the present invention is a copolymer of tetrafluoroethylene and/or chlorotrifluoroethylene with ethylene, propylene and/or isobutylene. A copolymer comprising less than 0.1% of recurring units deriving from monomers other than tetrafluoroethylene and/or chlorotrifluoroethylene with ethylene, propylene and/or isobutylene is hereafter referred to as a "binary copolymers".

The CTFE or TFE copolymer preferably comprises:
(a) from 35 to 65%, preferably from 45 to 55% more preferably from 48 to 52% by moles of ethylene (E);
(b) from 65 to 35%, preferably from 55 to 45% more preferably from 52 to 48% by moles of chlorotrifluoroethylene (CTFE) (for the ECTFE copolymers) and/or tetrafluoroethylene (TFE) (for the ETFE copolymers).

In a preferred embodiment, the copolymer (F) and/or (F') in the composition of the present invention is a copolymer of tetrafluoroethylene and/or chlorotrifluoroethylene with ethylene, propylene and/or isobutylene and further contains 0.1 to 30 mol % of one or more fluorinated comonomer and/or of one or more non-fluorinated hydrogen-containing comonomer. (hereafter: "ternary copolymer").

Preferably, the copolymer (F) and/or (F') is a copolymer of tetrafluoroethylene and/or chlorotrifluoroethylene with ethylene, propylene and/or isobutylene, wherein the molar ratio of non-fluorinated monomer to the fluorinated monomer is from 70:30 to 30:70, preferably 35:65 to 65:35 or 52:48 to 48:52, more preferably 50:50, and wherein said copolymer optionally contains 0.1 to 30 mol % (over the total amount of the constituents in the mixture expressed in moles) of one or more fluorinated comonomer and/or of one or more non-fluorinated hydrogen-containing comonomer (hereafter: "ternary copolymer").

More preferably, said copolymer comprises 0.2 to 10, even more preferably 1 to 6, most preferably 2 to 4 mol % (over the total amount of the constituents in the mixture expressed in moles) of one or more fluorinated comonomer and/or of one or more non-fluorinated hydrogen-containing comonomer.

Preferably, such non-fluorinated hydrogen-containing comonomer is selected from the group consisting of 3,3,3-trifluoro-2-trifluoromethylpropene (HFIB), perfluoropropylvinylether (PFPVE), 2,2,4-trifluoro-5-trifluoromethoxy-1,3-dioxole (TTD) and/or one or more non-fluorinated hydrogen-containing comonomer is selected from the group consisting of vinyl-acetate, vinylpropionate, vinyl-2-ethyl-hexanoate, ethyl acrylate, n-butyl acrylate, acrylic acid, hydroxyethyl acrylate, hydroxypropyl acrylate, (hydroxy)ethylhexyl acrylate, preferably acrylic acid or n-butyl acrylate, and mixtures thereof.

More preferably, said one or more fluorinated comonomer is 3,3,3-trifluoro-2-trifluoromethylpropene (HFIB) or perfluoropropylvinylether (PFPVE), even more preferably the content of HFIB or PFPVE in copolymer (F) and/or (F') is 3 to 10%, most preferably 5 to 6% in weight/total weight of the monomer.

End chains, defects or minor amounts of monomer impurities leading to recurring units different from those above mentioned can be still comprised in the preferred copolymer (F) and/or (F') in the composition of the invention, without this affecting properties of the material.

The melt index of the copolymer (F) and/or (F') in the composition of the invention is advantageously at least 0.2, preferably at least 0.5, more preferably at least 2 g/10 min.

The melt index of the copolymer (F) and/or (F') in the composition of the invention is advantageously less than 20, preferably less than 18, more preferably less than 15 g/10 min.

The melt index of ECTFE polymer is measured in accordance with ASTM test No. D 1238, run at 275° C., under a piston load of 2.16 kg. The polymer in the first and/or in the second powder in the composition of the invention has a melting point advantageously from 180 to 245° C. (ECTFE-based copolymer) or from 220 to 270° C. (ETFE-based copolymers).

The melting point is determined by DSC, at a heating rate of 10° C./min, according to ASTM D 3418.

Particles of fractions a) or b) may consist of the same partially fluorinated fluoropolymer-based copolymer or of two, or more, different partially fluorinated fluoropolymer-based copolymers. Preferably, particles of fractions a) or b) consist of the same partially fluorinated fluoropolymer-based copolymer (polymer (F)=polymer (F')).

The composition of the invention comprises a solid portion and an aqueous solvent (i.e. a liquid solvent consisting of or comprising water) in such ratio that the solid portion can be homogeneously suspended in the liquid one. Preferably, the composition of the invention is in the form of a slurry, i.e. a homogeneous, thick and flowing suspension or a fluid mixture of the pulverized insoluble solid with the solvent. The slurry according to the present invention can be prepared by standard methods, which are known to the person skilled in the art, and its texture and thickness can be adjusted using visual assessment so as to render it suitable for coating applications, e.g. by spraying.

The ratio of solid to liquid portion in the composition of the invention can be from 10:90 to 60:40. In a preferred embodiment, the ratio of solid to liquid portion in the composition is 20:80 to 50:50, more preferably 35:65 to 47:53 in weight/total weight of the composition of the invention. Preferably, in the composition according to the present invention the weight of the solid portion is 20 to 50% in weight/total weight of the composition.

The composition of the present invention comprises an aqueous mixture as a solvent. This is particularly advantageous to reduce the environmental impact of the coating process and the potential health issues for the involved personnel. Preferably, the composition according to the present invention comprises a water-miscible organic solvent in 0.1 to 20% weight/total weight of the composition. In a preferred embodiment, the composition comprises a mixture of water and a water-miscible organic solvent, wherein the organic solvent is 0.1 to 40%, preferably 5 to 30%, more preferably 15 to 25% in weight/total weight of the liquid portion. As non-limiting examples, such organic solvents can be alcohols, polyols, glycol derivatives and their mixtures.

As used herewith, the term "alcohol solvent" indicates an organic solvent comprising at least one hydroxyl group and being free from functional groups other than said hydroxyl group. Non-limiting examples are isopropanol, methanol, ethanol, butanol and their mixtures.

As used herewith, the term "polyol" indicates an organic solvent comprising two or more hydroxyl groups, e.g. a diol comprising two hydroxyl groups, such as ethylene glycol and propylene glycol, and polyols comprising three hydroxyl groups such as glycerin.

As used herewith, the term "glycol derivative" indicates a solvent deriving from a compound comprising at least two hydroxyl groups, wherein at least one of the hydroxyl groups is part of an ether or of an ester group.

Preferably, at least one glycol derivative solvent has a boiling point of at least 100° C.

Preferably, the glycol derivative in the composition according to the present invention complies with general formula (I):

(I)

R is a $C_1$-$C_6$ divalent hydrocarbon group, linear or branched, optionally containing one or more ether bonds;

X and Y, equal or different each other, are independently an hydrogen atom, a $C_1$-$C_6$ alkyl group, linear or branched, or a group of formula —C(O)—R', with R' being a $C_1$-$C_6$ alkyl group, linear or branched, with the provision that at least one of X and Y is not an hydrogen atom, and n is an integer between 1 and 3.

Preferably, the glycol derivative in the composition according to the present invention complies with formula (II) here below:

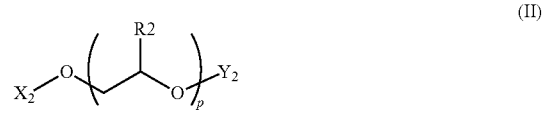

(II)

wherein R2 is an hydrogen atom or a methyl group;

X$_2$ and Y$_2$, equal or different each other, are independently an hydrogen atom, a —R" group or a —C(O)—R" group, with R" being a C$_1$-C$_4$ alkyl group, with the provision that at least one of X$_2$ and Y$_2$ is not an hydrogen atom; and p is an integer between 1 and 3.

Preferred water-miscible solvents in the composition of the invention are isobutyl alcohol (IBA), 1-propoxy-2-propanol (propylene glycol n-propyl ether, PNP), tripropylene glycol (TPG), tripropylene glycol monomethyl ether (TPM), ((2-(2-methoxymethylethoxy)methylethoxy)-propanol (TPG methyl ether) and mixtures thereof. Preferably, the weight ratio of aqueous solvents to water in the composition of the invention is 1:3 to 1:5, more preferably 1:35 to 1:45. In an even more preferred embodiment, the composition of the invention comprises IBA, PNP, TPM and TPG in 1.4:1.4:1:1 to 1.3:1.3:1:1 ratio.

Advantageously, it was found that the aqueous composition according to the present invention is not flammable, i.e. it complies with the combustibility requirements of tests ASTM 4206 and ADR (L.2).

Within the context of the present invention, the term "particle" is intended to denote a mass of material that, from a geometrical point of view, has a definite three-dimensional volume and shape, characterized by three dimensions, wherein none of said dimensions exceed the remaining two other dimensions of more than 200%. Particles are generally not equidimensional, i.e. that are longer in one direction than in others. The shape of a particle can be notably expressed in terms of the sphericity $\Phi_s$, which is independent of particle size. The sphericity of a particle is the ratio of the surface-volume ratio of a sphere with equal volume as the particle and the surface-volume ratio of the particle. For a spherical particle of diameter D$_p$, $\Phi_s$=1; for a non-spherical particle, the sphericity is defined as $$\Phi_s = (6 \cdot v_p)/(D_p \cdot S_p)$$

wherein:

Dp is the equivalent diameter of particle;

Sp is the surface area of one particle;

vp is the volume of one particle.

The equivalent diameter is defined as the diameter of a sphere of equal volume. Dp is usually taken to be the nominal size based on screen analysis or microscopic analysis. The surface area is found from adsorption measurements or from the pressure drop in a bed of particles. The particles of polymer (F) or (F') have a sphericity $\Phi_s$ of preferably at least 0.6, more preferably at least 0.65, even more preferably at least 0.7. Good results have been obtained with particles having a $\Phi_s$ from 0.7 to 0.95.

Particles of polymer (F) and (F') are generally obtained from suspension polymerization. The term particles is thus to be intended as distinguishable from pellets, which are obtained when extruding the polymer in the molten state into strands and chopping the strands into pellets.

For the purpose of the invention, the average particle size of polymer (F) and (F') particles can be notably measured according to standard sieving methods, following ASTM D1921 standard (for larger particles) or via photon correlation spectroscopy (PCS), following ISO 13321 standard (for smaller particles), which are well-known to the skilled in the art.

In an embodiment of the present invention, the average particle size distributions (PSD) can be determined by dry sieve analysis via the test method ASTM D1921 (method B).

The size distribution of the particles in the composition of the invention is bimodal, i.e. two major peaks of PSD are present, which correspond to the D50 values of the first powder (a) and of the second powder (b).

Preferably, the particles of the first powder have an average size (D50) of 4 to 5.5 micrometers, more preferably of about 5 micrometers, and/or the particles of the second powder have an average size (D50) about 25-40, more preferably 30 micrometers, or about 55-85, more preferably about 70-82 and most preferably about 80 micrometers.

Preferably, the particles of the second powder consist of EFTE or ECTFE binary copolymer having an average size (D50) about 20 to 40, more preferably 30 micrometers, or ETFE or ECTFE ternary copolymers having an average size (D50) or about 55-85, more preferably about 70-82 and most preferably about 80 micrometers.

In a more preferred embodiment, the aqueous composition according to the present invention comprises a solid portion and a liquid portion, wherein:

a) from 20 to 25% in weight/total weight of the solid portion consists of a first powder of at least one partially fluorinated copolymer (copolymer (F)) in the form of particles having average size (D50) from 3 to 6 micrometers;

b) from 75 to 80% in weight/total weight of the solid portion consists of a second powder of at least one partially fluorinated copolymer (copolymer (F')), equal to or different from copolymer (F), in the form of particles having average size (D50) from 20 to 90 micrometers.

Even more preferably, the aqueous composition according to the present invention comprises a solid portion and a liquid portion, wherein:

a) from 20 to 22% in weight/total weight of the solid portion consists of a first powder of at least one partially fluorinated copolymer (copolymer (F)) in the form of particles having average size (D50) of about 3 to 6 micrometers, most preferably of about 5 micrometers;

b) from 78 to 80% in weight/total weight of the solid portion consists of a second powder of at least one partially fluorinated copolymer (copolymer (F')), equal to or different from copolymer (F), in the form of particles having average size (D50) of about 60 to 80 micrometers, most preferably of about 80 micrometers.

The inventors found that composition of the invention can advantageously comprise other substances that improve its characteristics and/or performance of the coating obtainable by application of the composition on a surface.

Suitable optional substances comprise one of more additive such as antioxidant agents such as ADKP (anhydrous dipotassium phosphate) and DSTDP (Dioctadecyl 3,3'-thiodipropionate), anti-UV agents, thermal stabilizers, acid-scavengers, biocides such as Kathon® (The Dow Chemical Company), antirust such as tributyl phosphate, surfactants such as Mackamine LA® (Rhodia) or Genaminox® (Clariant), antifoam agents such as Rhodosil® EP/6703, thixotropic additives (rheology modifiers) such as urea-modified polyurethanes (e.g. BYK-420® and BYK-425® manufactured by BYK-Altana group), silicates and synthetic clays, polyhydroxycarboxylic acid esters, and inorganic salts, such as potassium nitrate. Generally, each of these components, if present, is comprised in amount from 0.01% to 5% in weight/weight of the solid portion of the composition.

Preferably, the composition of the invention comprises at least one thixotropic agent. It was fond that the presence of at least one thixotropic agent (i.e. a rheological additive) enhances the stability of the composition according to the invention, so that it can applied by spray-coating without further treatment up to 12-24 hours of storage after it is formed or obtained as a homogeneous dispersion by mild stirring or shaking. More preferably, the amount of said at least one thixotropic agent in the composition according to the invention is 0.01 to 2% in weight/weight of the solid portion of the composition. Most preferably, said at least one thixotropic agent is a urea-modified polyurethanes (e.g. BYK-420® and BYK-425® manufactured by BYK-Altana group), a silicate or a synthetic clay, and mixtures thereof.

In an aspect, the present invention relates to a process for manufacturing the composition as defined above, comprising blending in an aqueous solvent system a solid portion comprising a first powder of copolymer (F) particles having average size (D50) from 3 to 6 micrometers and a second powder of copolymer (F') particles having average size (D50) from 20 to 90 micrometers, wherein the weight of the first powder is from 15 to 30% in weight with respect to the total weight of the solid portion and the weight of the second powder is from 85 to 70% in weight with respect to the total weight of the solid portion.

Preferably, in the method according to the invention the solvent aqueous system comprises water and at least one glycol derivative solvent has a boiling point of at least 100° C.

Preferably, the glycol derivative in the method according to the present invention complies with general formula (I):

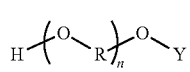
(I)

R is a $C_1$-$C_6$ divalent hydrocarbon group, linear or branched, optionally containing one or more ether bonds;

X and Y, equal or different each other, are independently an hydrogen atom, a $C_1$-$C_6$ alkyl group, linear or branched, or a group of formula —C(O)—R', with R' being a $C_1$-$C_6$ alkyl group, linear or branched, with the provision that at least one of X and Y is not an hydrogen atom, and n is an integer between 1 and 3.

Preferably, the glycol derivative in the method according to the present invention complies with formula (II) here below:

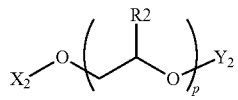
(II)

wherein R2 is an hydrogen atom or a methyl group;

$X_2$ and $Y_2$, equal or different each other, are independently an hydrogen atom, a —R" group or a —C(O)—R" group, with R" being a $C_1$-$C_4$ alkyl group, with the provision that at least one of $X_2$ and $Y_2$ is not an hydrogen atom; and p is an integer between 1 and 3.

Preferred water-miscible solvents used in the method of the invention are isobutyl alcohol (IBA), 1-propoxy-2-propanol (propylene glycol n-propyl ether, PNP), tripropylene glycol (TPG), tripropylene glycol monomethyl ether (TPM), ((2-(2-methoxymethylethoxy)methylethoxy)-propanol (TPG methyl ether) and mixtures thereof. Preferably, the weight ratio of aqueous solvents to water in the method of the invention is 1:3 to 1:5, more preferably 1:35 to 1:45. In an even more preferred embodiment, the composition of the invention comprises IBA, PNP, TPM and TPG in 1.4:1.4:1:1 to 1.3:1.3:1:1 ratio.

In another aspect, the present invention provides the use of the composition as defined above as a coating, and an article coated using the composition as above.

The inventors found that the composition as defined above can be advantageously used to coat the surface of an article to confer resistance against weather agents and corrosion and to improve mechanical properties.

Notably, it was found that the composition of the invention can be prepared and conveniently used in the coating process without addition of an antifoam agent. Such agents are generally required to avoid formation of foam, which may hinder the scalability of the process to industrial equipment. However, it was found that the presence of antifoam agents in the copolymer dispersion leads to substantial discoloration of the coating upon heating during the spray application to the surface. In fact, application of the coating to the surface is generally carried out at a temperature slightly above the melting point of the fluoropolymers, such as 260-265° C. for ECTFE polymers, for 20 to 40 minutes. It was observed that a fluoropolymer-based coating containing an anti-foaming agent (for example: a silica-supported polydimethylsiloxane), that is initially white, turns brownish to tan upon heating at 260-265° C. Although mainly an aesthetic issue, this is perceived as detrimental to the appearance of the coated articles and may limit the field of application of the coatings.

Advantageously, the composition according to the invention does not require the addition of an antifoam agent. In fact, foam is not observed during formulation and during application of the composition of the present invention as a coating. Without wishing to be bound by theory, this is likely due to the combination of particles having a small particle size and particles having a larger particles size in a specific ratio, which results in a suitable wettability and easy dispersion in the aqueous solvent without the formation of foam. Notably, little or no colour change is observed when a surface coated with the composition of the invention is heated at a temperature above the melting range of the fluoropolymer(s). The use of the composition according to the present invention advantageously results in coated articles with improved appearance and corrosion resistance, which find a wide range of applications.

Non-limiting examples of coated articles within the scope of the present invention comprise bearings, valve, electric wires, metal foils, boilers, impellers, tubes, pipes, ship bottoms, oven linings, bottom plates of irons, bread pans, rice cookers, grill pans, electric pots, ice-making trays, snow plough shovels, spades, chutes, conveyers, rolls, metal dies, dies, saws, files, tools such as drills, kitchen knives, scissors, hoppers, other industrial containers (particularly for the semiconductor industry) and casting molds.

Non-limiting examples of materials than can be coated according to the present invention include glass, ceramics, composite materials, metals and metal alloys such as iron, steel, particularly carbon steel and stainless steel, copper, tin, aluminium, bronze, brass and materials containing metals e.g. in powder or chip forms.

Although no preliminary treatment is generally needed before application of the coating according to the present invention, by virtue of the advantageous adhesive properties of the fluoropolymer-based composition, the surface to be coated can be optionally pre-treated or roughened to improve additionally the adhesion of the coating layer. Non-limiting examples of such treatments include priming, degreasing, etching, sandblasting, and the like.

Preferably, the composition according to the present application is applied as a coating directly to the surface to be treated, without the preliminary application of a primer, thus saving costs and overall duration of the coating process.

Alternatively, a primer can be applied to the surface prior to coating with the composition of the invention. Non-limiting examples of primers that can be used are those described in US 2005070659 A (SOLVAY) Mar. 31, 2005 and in the references cited therein.

Should the disclosure of any patents, patent applications, and publications which are incorporated herein by reference conflict with the description of the present application to the extent that it may render a term unclear, the present description shall take precedence.

The following examples are provided to illustrate the invention and they are not intended to limit its scope.

EXAMPLES

Example 1

Starting Materials:
Copolymer A (ECTFE) copolymer from Solvay Specialty Polymers Italy; Average PSD (D50): 5 µm, test method ASTM1921

Copolymer B (ethylene/chlorotrifluoroethylene copolymer, ECFTE) copolymer from Solvay Specialty Polymers Italy; Average PSD (D50): 80 µm, test method ASTM1921
Tributyl phosphate
Potassium nitrate
Methylchloroisothiazolinone/methylisothiazolinone (Kathon®), Isobutyl alcohol (IBA), Propylene Glycol n-Propyl Ether (PNP),
Tripropylene Glycol monomethyl ether (TPM), Tripropylene glycol (TPG): all supplied by The Dow Chemical Company
Lauramine oxide (LA): Mackamine® LA supplied by Rhodia.
Thixotropic agent (rheology modifier): BYK-420® (supplied by BYK-Altana Group)
Procedure for the Preparation of the Composition Example 1

A mixture of PNP (13.9 g), IBA (13.9 g), TPM (10.4 g) and TPG (10.4 g) was dissolved in water (201.5 g) in a 1 L vessel. Tributylphosphate (2.5 g), sodium pyrophosphate (2.5 g), LA (12.5 g), potassium nitrate (0.5 g) and Kathon® (1 ppm) were then added. The mixture was then moderately stirred (about 1000 rpm) using a mechanical dissolver (Dispermat® LC) for 5 minutes to obtain a clear and homogeneous solution. ECFTE copolymer A having PSD (D50)=5 µm (57.9 g) was added to the solution under mild mechanical stirring (500 rpm) in small portions over 5 min. ECFTE copolymer B having PSD (D50)=80 µm (173.6 g) was then added to the suspension under mild mechanical stirring (500 rpm) in small portions over 10 min. The suspension thus obtained was vigorously stirred (about 2500 rpm) using a mechanical dissolver (Dispermat® LC) for 20 minutes The composition thus obtained was homogeneous, in that no distinct separation was observable between the liquid and the solid portions up to 4 hours after shaking or stirring the suspension. A homogeneous dispersion was readily formed upon mild stirring or shaking of the composition after prolonged storage (2-7 days). The slurry was suitable for application as a coating by spray techniques for up to 24 hours after the homogeneous dispersion is obtained.

Example 2

The composition was prepared according to the procedure and using the same ingredients as Example 1, except that 2.5 g of BYK-420® were added, the amount of water was 200 g and the amount of ECFTE copolymer B having PSD (D50)=80 µm was 172.6 g.

The composition thus obtained was homogeneous, in that no distinct separation was observable between the liquid and the solid portions up to 24 hours after shaking or stirring the suspension. A homogeneous dispersion was readily formed upon mild stirring or shaking of the composition after prolonged storage (7-10 days). The slurry was suitable for application as a coating by spray techniques for up to 48 hours after the homogeneous dispersion is obtained.

Comparative Example 1

A comparative composition was prepared using the starting materials and procedure of example 1, except that only ECTFE copolymer B powder having average PSD (D50) =80 µm (231.5 g) was used.
Complete separation of the solid portion was observed after 10 minutes from initial suspension.
Complete separation after 10 min is also observed for the above comparative composition further comprising 1% of a rheology modifier (BYK-420® supplied by BYK-Altana Group). Thus, the addition of a rheology modifier does not enhance the behaviour of the composition in the absence of a first powder of at least one partially fluorinated copolymer (copolymer (F)) in the form of particles having average size (D50) from 3 to 6 micrometers.

The comparative composition was not suitable for application as a coating using spray techniques, as it immediately clogged the nozzle of the spraying device.

Comparative Example 2

A comparative composition was prepared using the starting materials and procedure of example 1, except that only ECTFE copolymer A powder having average PSD (D50)=5 µm (231.5 g) was used.
The ECTFE copolymer A powder having average PSD (D50)=5 µm was not wettable in aqueous solvent systems and formed a compact paste at the bottom of the container, which could not be dispersed.

Coating Procedure:
The surface of a stainless steel test specimen was sandblasted (using 16 mesh sand) and the composition of Example 1 was sprayed on the pre-treated surface at 25° C. The coated specimen was then gradually heated to 265° C. in 50 minutes and kept at 265° C. for 15 minutes. The specimen was then allowed to cool to 25° C.

A uniform coating, free of cracks and visible imperfections, was obtained on the surface. No discoloration was observed upon heating/cooling of the coated specimen.

A second layer of coating was applied repeating the same procedure on the coated specimen (temperature of second coating=70° C. or lower), obtaining similar results in terms of visual appearance.

Optionally, additional layers of coating can be applied.

The invention claimed is:
1. A composition comprising an aqueous solvent and a solid portion, wherein:
a) from 15 to 30% in weight/total weight of the solid portion consists of a first powder of at least one copolymer (F) in the form of particles having average size (D50) from 3 to 6 micrometers, wherein copolymer (F) is a partially fluorinated copolymer;
b) from 70 to 85% in weight/total weight of the solid portion consists of a second powder of at least one copolymer (F') in the form of particles having average size (D50) from 20 to 90 micrometers, wherein copolymer (F') is a partially fluorinated copolymer which is the same as or different from copolymer (F);
wherein the average particle size is measured according to test method ASTM D1921.

2. The composition according to claim 1 wherein the particles of the first powder have an average size (D50) about 5 micrometers, and/or the particles of the second powder have an average size (D50) about 30 or about 80 micrometers.

3. The composition according to claim 1, wherein copolymer (F) and/or copolymer (F') comprises:
i. from 1 to 75 mol % of recurring units derived from at least one ethylenically unsaturated non-fluorinated monomer, which comprises at least one hydrogen atom; and
ii. from 25 to 99 mol % of recurring units derived from at least one fluorinated monomer.

4. The composition according to claim 3, wherein copolymer (F) and/or copolymer (F') is a copolymer of tetrafluoroethylene and/or chlorotrifluoroethylene with ethylene, propylene and/or isobutylene, wherein the molar ratio of non-fluorinated monomer to the fluorinated monomer is from 70:30 to 30:70, and wherein said copolymer optionally contains 0.1 to 30 mol % of one or more fluorinated comonomer and/or of one or more non-fluorinated hydrogen-containing comonomer.

5. The composition according to claim 4, wherein copolymer (F) and/or copolymer (F') is an ETFE- or ECTFE-based copolymer.

6. The composition according to claim 4, wherein copolymer (F) and/or copolymer (F') contains 0.1 to 30 mol % of one or more fluorinated comonomers selected from the group consisting of 3,3,3-trifluoro-2-trifluoromethylpropene (HFIB), perfluoropropylvinylether (PPVE), 2,2,4-trifluoro-5-trifluoromethoxy-1,3-dioxole (TTD) and/or of one or more non-fluorinated hydrogen-containing comonomers selected from the group consisting of vinyl acetate, vinyl acrylatepropionate, vinyl-2-ethylhexanoate, ethyl acrylate, n-butyl acrylate, acrylic acid, hydroxyethyl acrylate, hydroxypropyl acrylate, (hydroxy)ethylhexyl acrylate, and mixtures thereof.

7. The composition according to claim 1, wherein the weight of the solid portion is 20 to 50% in weight/total weight of the composition.

8. The composition according to claim 1, further comprising a water-miscible organic solvent in 0.1 to 20% weight/total weight of the composition.

9. The composition according to claim 1, wherein copolymer (F) and copolymer (F') are the same partially fluorinated copolymer.

10. The composition according to claim 1, further comprising a rheology modifier.

11. A process for manufacturing the composition of claim 1, the process comprising blending in an aqueous solvent system a solid portion comprising a first powder of copolymer (F) particles having average size (D50) from 3 to 6 micrometers and a second powder of copolymer (F') particles having average size (D50) from 20 to 90 micrometers, wherein the weight of the first powder is from 15 to 30% in weight with respect to the total weight of the solid portion and the weight of the second powder is from 85 to 70% in weight with respect to the total weight of the solid portion.

12. A coating comprising the composition of claim 1.

13. An article coated using the composition of claim 1.

14. The composition according to claim 4, wherein the molar ratio of non-fluorinated monomer to the fluorinated monomer is from 35:65 to 65:35.

15. The composition according to claim 14, wherein the molar ratio of non-fluorinated monomer to the fluorinated monomer is 50:50.

16. The composition according to claim 5, wherein copolymer (F) and/or copolymer (F') is an ECTFE-based copolymer.

17. The composition according to claim 6, wherein the one or more non-fluorinated hydrogen-containing comonomers is selected from the group consisting of n-butyl acrylate, acrylic acid, and mixtures thereof.

* * * * *